US012712574B2

(12) United States Patent
Nam et al.

(10) Patent No.: US 12,712,574 B2
(45) Date of Patent: Aug. 18, 2026

(54) LOW NOISE AMPLIFIER AND RECEIVER USING SAME IN WIRELESS COMMUNICATION SYSTEM

(71) Applicant: SAMSUNG ELECTRONICS CO., LTD., Suwon-si (KR)

(72) Inventors: Hyohyun Nam, Suwon-si (KR); Jungsik Kim, Suwon-si (KR); Daeyoung Lee, Suwon-si (KR); Heesung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/615,412

(22) Filed: Mar. 25, 2024

(65) Prior Publication Data

US 2024/0333321 A1 Oct. 3, 2024

(30) Foreign Application Priority Data

Mar. 27, 2023 (KR) ........................ 10-2023-0040019
Mar. 8, 2024 (KR) ........................ 10-2024-0033114

(51) Int. Cl.
*H04B 1/00* (2006.01)
*H03F 1/38* (2006.01)
(Continued)

(52) U.S. Cl.
CPC ............. *H04B 1/0078* (2013.01); *H04B 1/04* (2013.01); *H04B 2001/0408* (2013.01)

(58) Field of Classification Search
CPC .......... H04B 1/04; H04B 1/0078; H04B 1/06; H04B 1/10; H04B 1/16; H04B 2001/0408;
(Continued)

(56) References Cited

U.S. PATENT DOCUMENTS 9,369,091 B2 * 6/2016 Horng .................... H03F 3/193
10,536,119 B2 * 1/2020 Kim ...................... H04B 1/525
(Continued)

FOREIGN PATENT DOCUMENTS

CN 103684275 A 3/2014
CN 114844470 A 8/2022
(Continued)

OTHER PUBLICATIONS

International Search Report and Written Opinion of the International Searching Authority dated Jun. 20, 2024, in connection with International Application No. PCT/KR2024/003635, 7 pages.
(Continued)

*Primary Examiner* — Quochien B Vuong

(57) ABSTRACT

The present disclosure relates to a 5G communication system or a 6G communication system for supporting higher data rates beyond a 4G communication system such as long term evolution (LTE). A low noise amplifier (LNA) in a wireless communication system according to an embodiment of the disclosure includes a first transistor and a first feedback transformer in which a gate of the first transistor is connected to a primary coil of the first feedback transformer and a source of the first transistor is connected to a secondary coil of the first feedback transformer. The first feedback transformer is configured to implement positive feedback to maintain an in-phase signal at the gate of the first transistor and the source of the first transistor.

18 Claims, 17 Drawing Sheets

(51) Int. Cl.

| | |
|---|---|
| ***H03F 3/193*** | (2006.01) |
| ***H04B 1/04*** | (2006.01) |
| ***H04B 1/16*** | (2006.01) |

(58) Field of Classification Search

CPC ..... H03F 1/26; H03F 1/38; H03F 3/04; H03F 3/16; H03F 3/189; H03F 3/19; H03F 3/193; H03F 2200/294

See application file for complete search history.

(56) References Cited

U.S. PATENT DOCUMENTS

| | | | | |
|---|---|---|---|---|
| 10,707,817 | B2 | 7/2020 | Huang et al. | |
| 10,903,805 | B2 * | 1/2021 | Bagga | H03F 1/347 |
| 12,381,518 | B2 * | 8/2025 | Husain | H03F 3/193 |
| 2007/0176703 | A1 | 8/2007 | Li et al. | |
| 2007/0285162 | A1 | 12/2007 | Vitzilaios et al. | |
| 2007/0290745 | A1 | 12/2007 | Vitzilaios et al. | |
| 2011/0148527 | A1 | 6/2011 | Bagga | |
| 2012/0218041 | A1 | 8/2012 | Mineyama | |
| 2014/0015614 | A1 | 1/2014 | Oliveira et al. | |
| 2015/0035600 | A1 | 2/2015 | Jin et al. | |
| 2015/0214900 | A1 | 7/2015 | Horng et al. | |
| 2016/0322939 | A1 | 11/2016 | Liu et al. | |
| 2019/0356280 | A1 | 11/2019 | Bagga et al. | |

FOREIGN PATENT DOCUMENTS

| | | | |
|---|---|---|---|
| KR | 20130037358 | A | 4/2013 |
| KR | 20160028492 | A | 3/2016 |
| KR | 10-2016-0129686 | A | 11/2016 |
| KR | 10-2021-0014151 | A | 2/2021 |

OTHER PUBLICATIONS

Supplementary European Search Report dated Jun. 18, 2026, in connection with European Patent Application No. 24781137.5, 11 pages.

Tasic et al., “Concept of transformer-feedback degeneration of low-noise amplifiers,” IEEE / Proceedings of the 2003 International Symposium on Circuits and Systems (ISCAS 2003), vol. 1, May 25, 2003, 4 pages.

* cited by examiner (a)

(b)

(a)

(b)

(a)

(b)

(a)

(b)

LOW NOISE AMPLIFIER AND RECEIVER USING SAME IN WIRELESS COMMUNICATION SYSTEM

CROSS-REFERENCE TO RELATED APPLICATIONS

This application is based on and claims priority under 35 U.S.C. § 119 to Korean Patent Application No. 10-2023-0040019 filed Mar. 27, 2023, and Korean Patent Application No. 10-2024-0033114, filed Mar. 8, 2024, both of which were filed in the Korean Intellectual Property Office, and, the entire disclosures of which are incorporated herein by reference.

BACKGROUND

1. Field

The disclosure relates to a low noise amplifier (LNA) with transformer feedback of a receiver that receives wireless signals in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

The disclosure provides a low noise amplifier implementing positive feedback with a gate-source transformer in a wireless communication system.

According to an embodiment of the disclosure, a low noise amplifier in a wireless communication system may include a first transistor and a first feedback transformer in which a gate of the first transistor is connected to a primary coil of the first feedback transformer and a source of the first transistor is connected to a secondary coil of the first feedback transformer. The first feedback transformer implements positive feedback to maintain an in-phase signal at the gate of the first transistor and the source of the first transistor.

According to an embodiment of the disclosure, a receiver that receives a radio frequency (RF) signal in a wireless communication system may include a low noise amplifier and a signal processor configured to apply the RF signal to the low noise amplifier. The low noise amplifier includes a first transistor and a first feedback transformer in which a gate of the first transistor is connected to a primary coil of the first feedback transformer and a source of the first transistor is connected to a secondary coil of the first feedback transformer, and the RF signal is applied to the primary coil and then transmitted to the secondary coil in the same phase.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
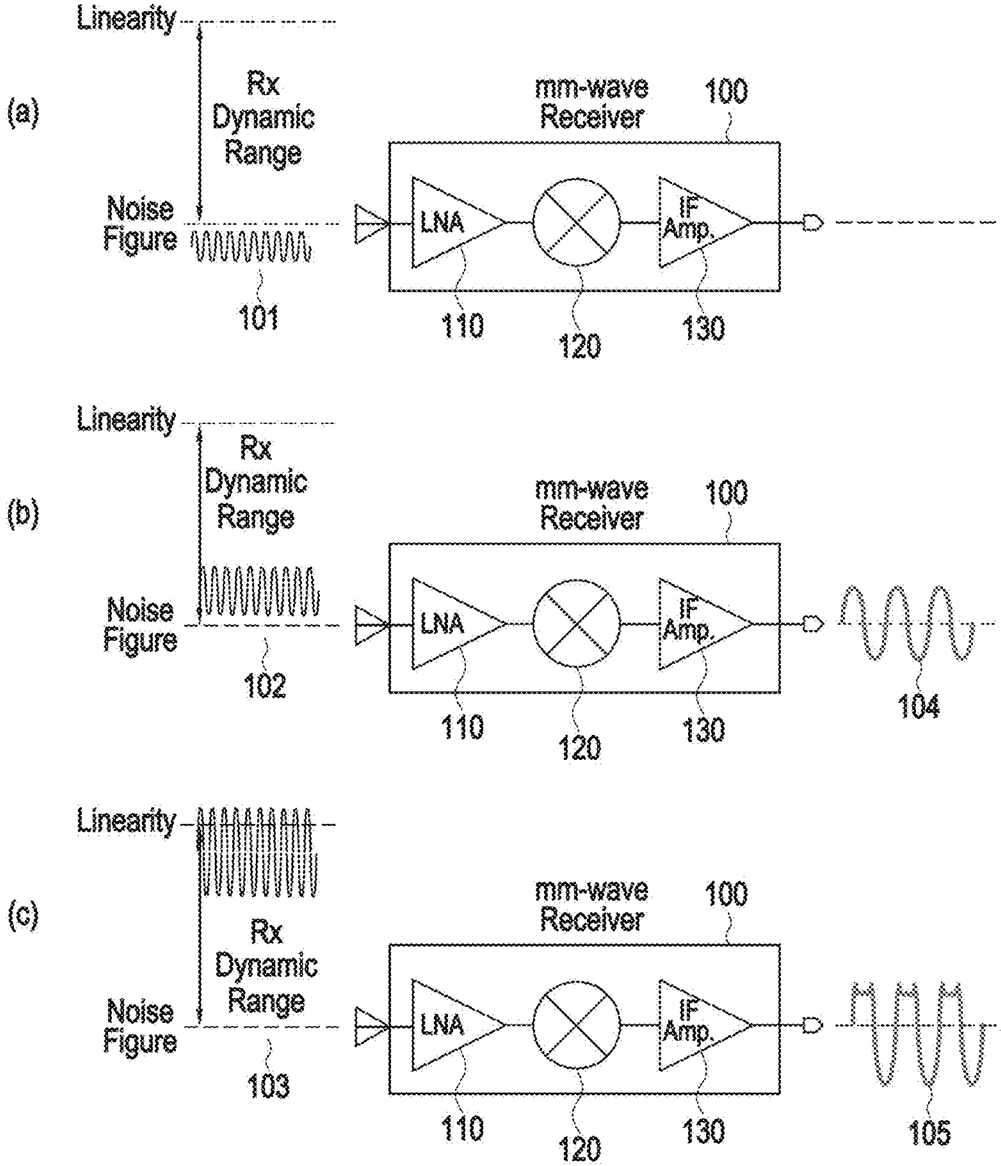
FIG. 1 illustrates a diagram of the structure and Rx dynamic range of a general receiver using an LNA in a wireless communication system.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. It should be noted that, in the accompanying drawings, the same or like elements are designated by the same or like reference signs as much as possible. Also, it should be noted that the following accompanying drawings of the disclosure are provided to assist in understanding the disclosure, and the disclosure is not limited to the forms or configurations illustrated in the drawings of the disclosure. Furthermore, detailed descriptions of known functions or configurations that may make the subject matter of the disclosure unclear will be omitted. It should be noted that, in the following description, only parts required to understand operations according to various embodiments will be described and a description of the other parts will be omitted so as not to make the subject matter of the disclosure obscure. Furthermore, various embodiments of the disclosure will be described using terms employed in some communication standards (e.g., 3rd generation partnership project (3GPP) standards), but they are merely an example for the sake of description. Various embodiments of the disclosure may also be easily applied to other communication systems through modifications.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

As used herein, each of such phrases as "A and/or B," "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order).

In a wireless communication system, a receiver is a device that amplifies a radio frequency (RF) signal input through an antenna using a low noise amplifier (LNA) and then frequency down-converts the amplified RF signal to an intermediate frequency signal or a baseband signal through a mixer. The Rx dynamic range of the receiver may be determined based on linearity, which determines the maximum input level that can be tolerated in the low noise amplifier circuit, and noise figure (NF), which determines the minimum input level. The NF is an indicator that indicates how much noise is added as an input signal passes through a device or circuit block. The LNA located at the input terminal of the receiver is a key block that determines the NF of a receiving system and requires design to have the lowest possible NF.

FIG. 1 is a diagram illustrating the structure and Rx dynamic range of a general receiver using a low noise amplifier (LNA) in a wireless communication system.

A receiver 100 of FIG. 1 may be a receiver that receives millimeter wave (mm-wave) signals in a 5G system. The receiver 100 includes an LNA 110 that amplifies and outputs a radio frequency (RF) signal received through an antenna, a mixer 120 that frequency down-converts the amplified signal into an intermediate frequency (IF) signal or a baseband signal, and an IF amplifier 130 that amplifies and outputs the frequency-converted signal. In general, the LNA 110 may be designed using a small-sized transistor to minimize the noise figure (NF). On the other hand, the linearity of the LNA 110 is proportional to the size of the transistor.

In (a) of FIG. 1, there is illustrated a case in which the input power level of an RF signal 101 in the receiver 100 is lower than the minimum input power level (i.e., NF) of the LNA 110, whereby the input power level of the RF signal is outside a Rx dynamic range of the receiver 100. As illustrated in (a) of FIG. 1, when the input power level of the RF signal 101 is lower than the NF, the RF signal 101 that is outside the Rx dynamic range of the receiver 100 cannot be processed.

In (b) of FIG. 1, there is illustrated a case in which the input power level of an RF signal 102 is higher than the minimum input power level of the LNA 110 and lower than the maximum input level that can be tolerated in the LNA 110, whereby the input power level of the RF signal 102 is within the Rx dynamic range of the receiver 100 of which linearity is maintained. As illustrated in (b) of FIG. 1, when the input power level of the RF signal 102 is within the Rx dynamic range of the receiver 100, the receiver 100 normally outputs the RF signal 101 into an IF signal or baseband signal at 104.

In (c) of FIG. 1, there is illustrated a case in which the input power level of an RF signal 103 in the receiver 100 is higher than the minimum input power level of the LNA 110, but partially exceeds the maximum input level of the LNA 110, whereby the input power level of the RF signal is partially outside the Rx dynamic range of the receiver 100. As illustrated in (c) of FIG. 1, when the input power level of the RF signal 101 is partially outside the Rx dynamic range of the receiver 100, the linearity of the LNA 110 cannot be maintained in the receiver 100, whereby an output signal 105 contains distorted elements.

In the receiver 100, since the linearity of the LNA 110 is proportional to the size of the transistor included in the LNA 110, the LNA 110 can be said to be a block with low linearity. Therefore, it is important that the LNA located at the input terminal of the receiver is designed to have the lowest possible NF within a range where linearity is maintained.

In general, a large number of on-chip lumped passive components (e.g. spiral inductor, transmission line, capacitor, etc.) are used in the design of the LNA to implement NF minimization, wideband impedance matching (high gain), etc. In particular, since the size of the on-chip passive components occupies most of the chip area in a 6G target band (upper-mid band), in an extreme multiple-input and multiple-output (X-MIMO) system that requires more than 1000 antenna elements, a compact design of the RF-front-end is essential. Therefore, transformer-based matching network implementation technology can be used in various circuit designs for the purpose of implementing the compact design of an RF integrated circuit (RFIC).

Figure 2A:
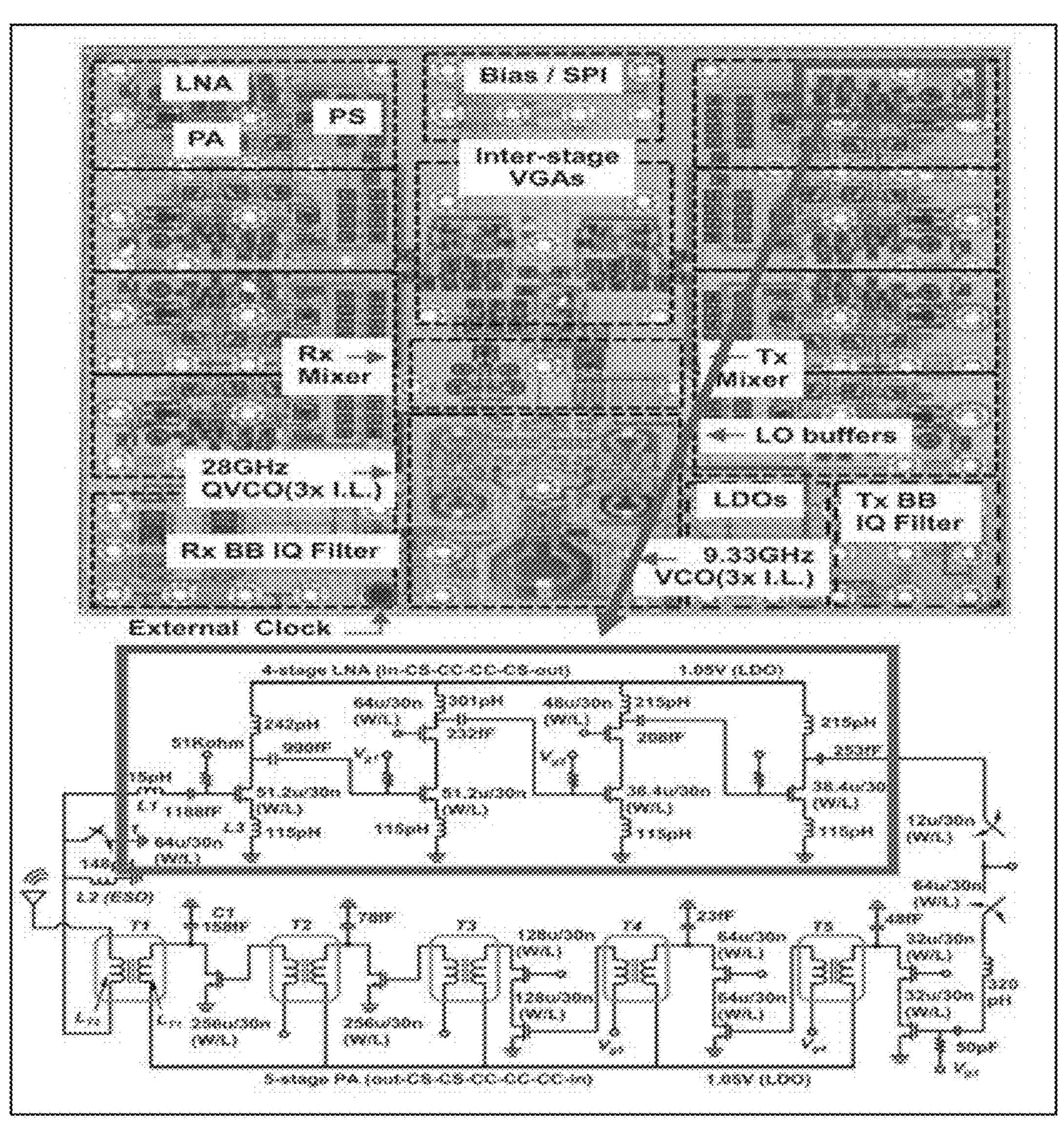
FIGS. 2A and 2B illustrate diagrams of examples of the chip of a circuit including a passive component of an LNA and a circuit including a transformer component in a wireless communication system.
Figure 2B:
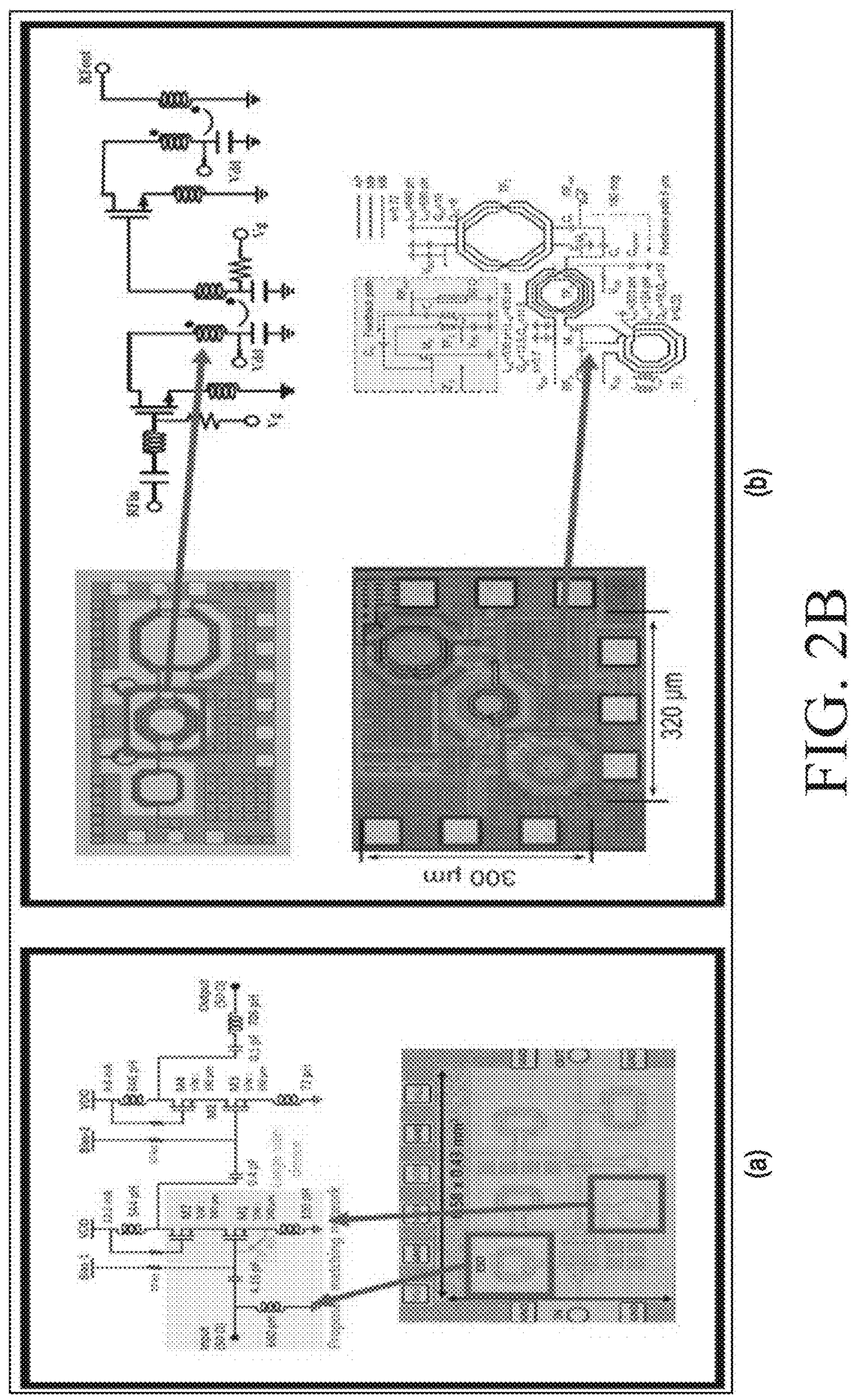

FIGS. 2A and 2B are diagrams illustrating examples of the chip of a circuit including a passive component of an LNA and a circuit including a transformer component in a wireless communication system.

FIG. 2A illustrates an area occupied by passive components in a receiver, and referring to (a) of FIG. 2B, it can be seen that an area within the chip occupied particularly by inductors is large. Referring to (b) of FIG. 2B, a compact design can be implemented by implementing a matching network based on one transformer combining two inductors.

The disclosure proposes a structure in which, in an LNA used in an upper-mid frequency band, an inter-stage matching network based on two different transformer feedbacks is designed to implement the compact design while improving gain characteristics and wideband operation characteristics.

Figure 3:
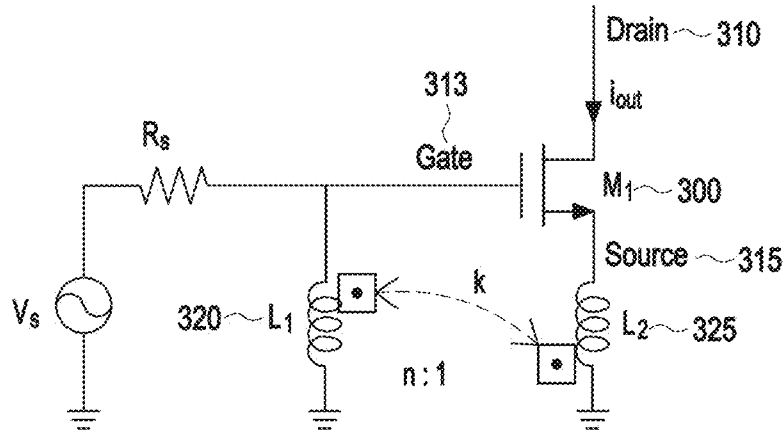
FIG. 3 illustrates a diagram of an example of a common-source amplifier based on a transformer in a wireless communication system.

FIG. 3 is a diagram illustrating an example of a common-source amplifier based on a transformer in a wireless communication system.

In a common-source amplifier, a gate-source (GS) transformer-feedback structure as illustrated in FIG. 3 is used for the purpose of improving stability and noise figure (NF) characteristics and achieving a compact design.

Referring to FIG. 3, the common-source amplifier includes a first transistor M1 300, and the first transistor M1 300 includes a drain 310, a gate 313, and a source 315. The common-source amplifier may include a feedback transformer structure including a first inductor L1 320 and a second inductor L2 325. The first inductor L1 320 may be connected to the gate 313 of the first transistor M1 300 and the second inductor L2 325 may be connected to the source 315 of the first transistor M1 300 to achieve the GS transformer-feedback structure. The polarity of the GS transformer of FIG. 1 represents negative feedback, as illustrated in dot notation. The GS transformer may adjust the voltage level based on a ratio of the number of turns on the coils of the first inductor L1 320 and the second inductor L2 325.

Figure 4A:
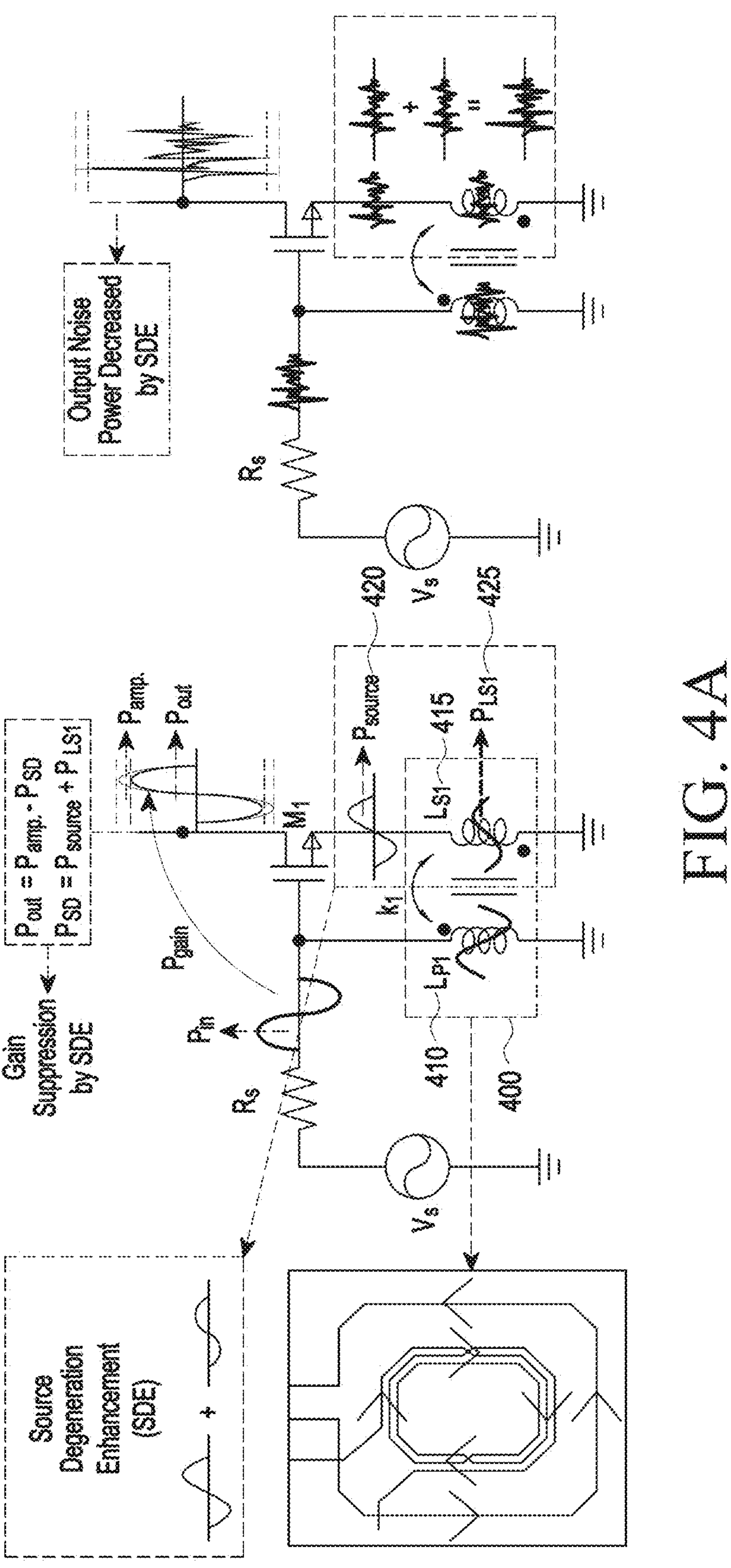
FIG. 4A illustrates a diagram of a negative feedback operation of a gate-source transformer of an LNA in a wireless communication system.

FIG. 4A is a diagram illustrating a negative feedback operation of a gate-source (GS) transformer of a low noise amplifier (LNA) in a wireless communication system.

Referring to FIG. 4A, a GS transformer (TF) 400 implements reversely connected (i.e., reversed dot notation) negative feedback. That is, a signal applied to a primary coil LP1 410 of the GS TF 400 is transmitted to a secondary coil LS1 415 in a reverse manner whereby negative feedback is implemented. At this time, it can be seen that the phase of an inductive source degeneration signal Psource 420 implemented by the secondary coil LS1 415 and the phase of a signal PLS1 425 coupled by a coupling coefficient k1 of the GS TF 400 are the same.

Accordingly, as the power PSD of source degeneration increases, stability and NF characteristics can be improved and an input matching network can be implemented with a single TF, whereby the compact design can be achieved.

Figure 4B:
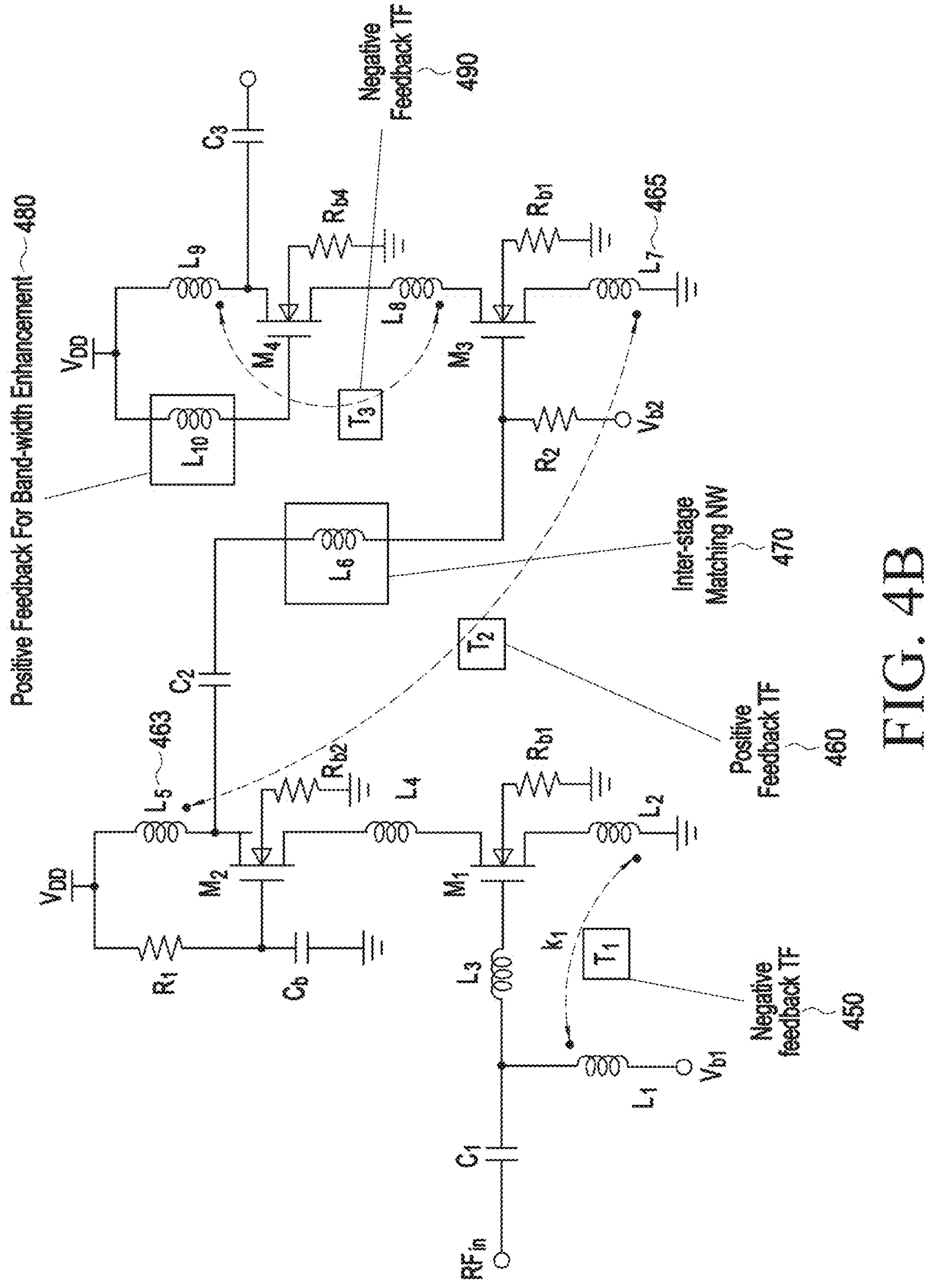
FIG. 4B illustrates a diagram of a positive feedback operation of a drain-source transformer of an LNA in a wireless communication system.

FIG. 4B is a diagram illustrating a positive feedback operation of a drain-source transformer of a low noise amplifier in a wireless communication system.

FIG. 4B illustrates a case in which the negative feedback T1 450 of a GS TF is used in a cascade-based amplifier. In addition, to implement positive feedback in the LNA of a 2nd-stage, a positive feedback T2 460 of a drain-source (DS) transformer (TF) can be implemented through a drain inductor L5 463 of a 1st-stage and a source inductor L7 465 of the 2nd-stage.

However, when the LNA is designed using the negative feedback T1 450 of the GS transformer TF as illustrated in FIG. 4B, the gain characteristics of the LNA may deteriorate because the inductive source degeneration is improved due to the negative feedback. Therefore, in a multi-stage amplifier connected to the 2nd and 3rd-stages in addition to the 1st-stage, the negative feedback of the GS transformer TF has the effect of improving stability and NF characteristics in addition to the compact design, but an increase in the chip area and power consumption may occur due to the addition of the number of stages to reach the performance target. Accordingly, the gain can be compensated by implementing positive feedback, using a lumped inductor, and using a cascade structure.

In addition, when the LNA is designed using the positive feedback T2 460 of the DS transformer TF as illustrated in FIG. 4B, it is difficult to implement an inter-stage matching network between a drain terminal of the 1st-stage and a gate terminal of the 2nd-stage, whereby design complexity increases due to the use of an additional inductor L6 470. In addition, an additional inductor L10 480 is used for bandwidth enhancement. When the positive feedback is implemented in a cascade amplifier structure, the stability performance may decrease due to a rapid increase in the gain performance of the LNA. To improve this, a negative feedback T3 490 of an additional DS TF may be used.

Accordingly, the disclosure proposes a structure for implementing a compact design, improving gain performance, and enhancing bandwidth of the LNA.

Figure 5:
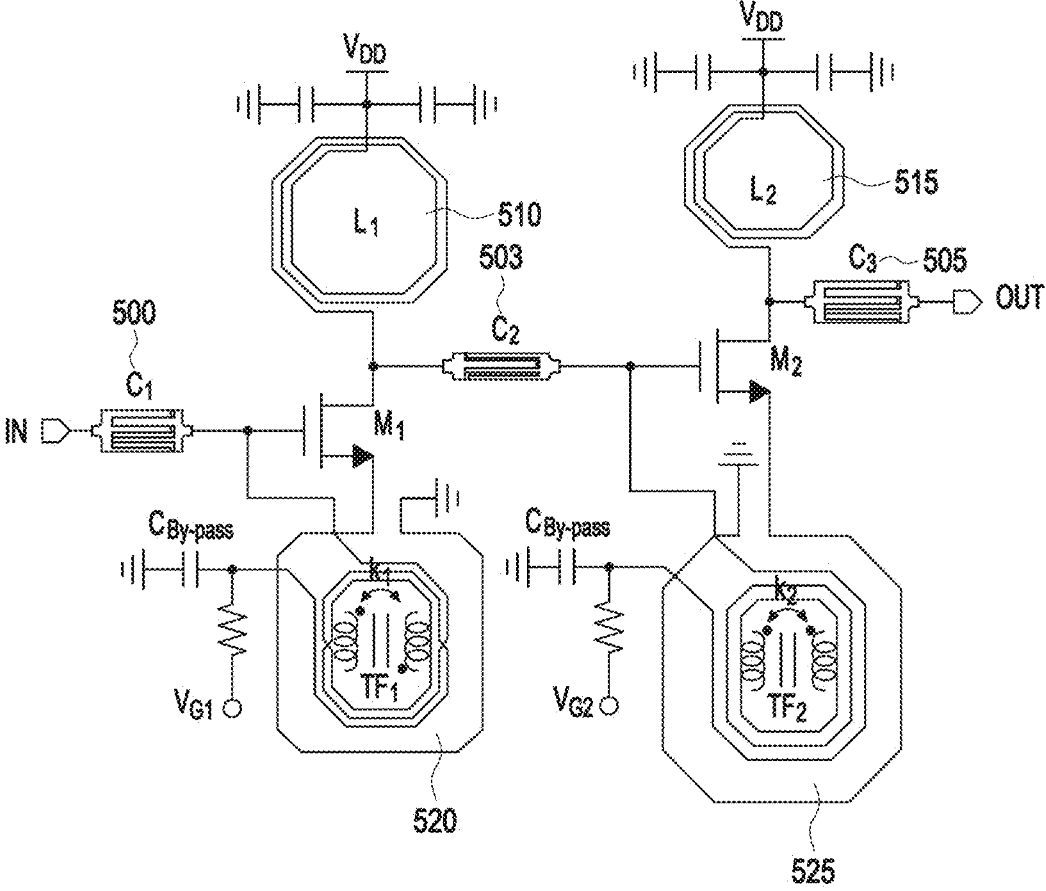
FIG. 5 illustrates a diagram of an example of implementing transformer feedback in an LNA with a two-stage structure according to an embodiment of the disclosure.

FIG. 5 is a diagram illustrating an example of implementing transformer feedback in an LNA with two-stage structure according to an embodiment of the disclosure.

FIG. 5 illustrates positive feedback that is implemented using a GS TF in the LNA with two-stage structure.

Referring to FIG. 5, the LNA with two-stage structure may include capacitors C1 500, C2 503, and C3 505, inductors L1 510 and L2 515, and transformers TF1 520 and TF2 525.

In an embodiment, the capacitors C1 500, C2 503, and C3 505 serve as alternating current (AC) coupling capacitors and are used to implement an input matching network, an inter-stage matching network, and an output matching network. The inductors L1 510 and L2 515 are used to implement gain peaking, and the inter-stage matching network and the output matching network.

In an embodiment, a first transformer TF1 520 may implement gate-source feedback in the common-source amplifier of the 1st-stage, and implement negative feedback according to the direction of current. In an embodiment, depending on the LNA applications, 1) the 1st-stage can be implemented with a cascade amplifier structure, 2) the input/noise matching network and inductive source degeneration can be implemented using a single inductor without feedback, and 3) they can also be implemented with positive feedback.

In an embodiment, the second transformer TF2 525 may implement gate-source feedback in the 2nd-stage common-source amplifier, and implement positive feedback according to the direction of the current. In an embodiment, depending on the amplifier applications, 1) the 2nd-stage can be implemented with a cascade amplifier structure, 2) the inter-stage matching network can be implemented and inductive source degeneration can be implemented using a single inductor without feedback, 3) it can also be implemented with negative feedback.

In FIG. 5, a two-stage amplifier based on a common-source amplifier has been described as an example, but the structure of the amplifier and the number of stages are not limited, and the amplifier may implement positive feedback with a transformer at the gate-source terminal of the used transistor.

Figure 6:
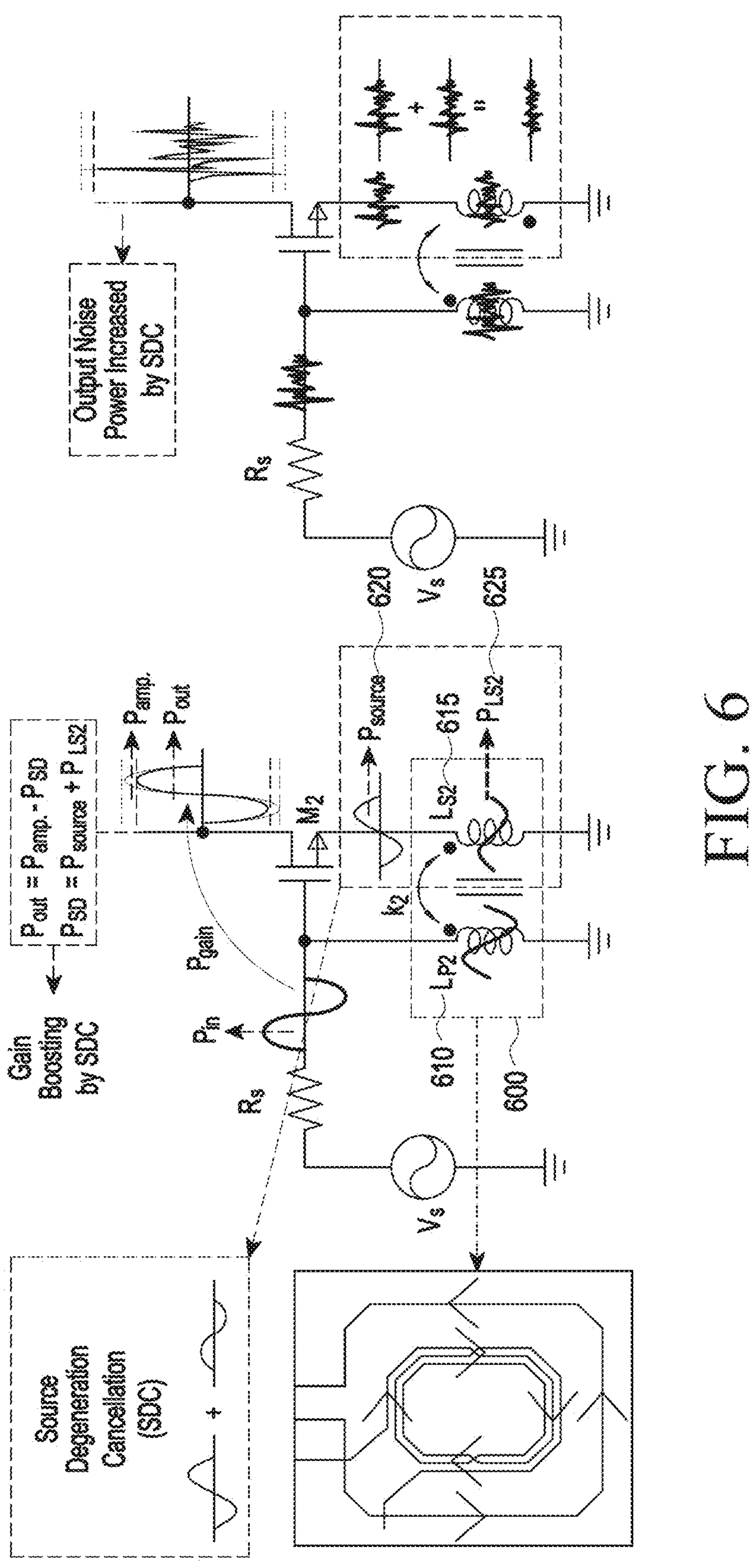
FIG. 6 illustrates a diagram of a positive feedback operation of a gate-source transformer of an LNA according to an embodiment of the disclosure.

FIG. 6 is a diagram illustrating a positive feedback operation of a gate-source (GS) transformer (TF) of an LNA according to an embodiment of the disclosure.

Referring to FIG. 6, a GS TF 600 implements identically connected positive feedback (i.e., dot notation is in the same direction). That is, in the GS TF 600, a signal applied to a primary coil LP2 610 is transmitted in the same phase to a secondary coil LS2 615 to implement positive feedback.

Here, it can be seen that the phase of an inductive source degeneration signal Psource 620 implemented by the secondary coil LS2 615 and the phase of a signal PLS2 625 coupled by a coupling coefficient k2 of the GS TF 600 are opposite. Accordingly, as source degeneration cancellation occurs and the power PSD of source degeneration is reduced, the output power Pout increases and the gain improves.

Figure 7:
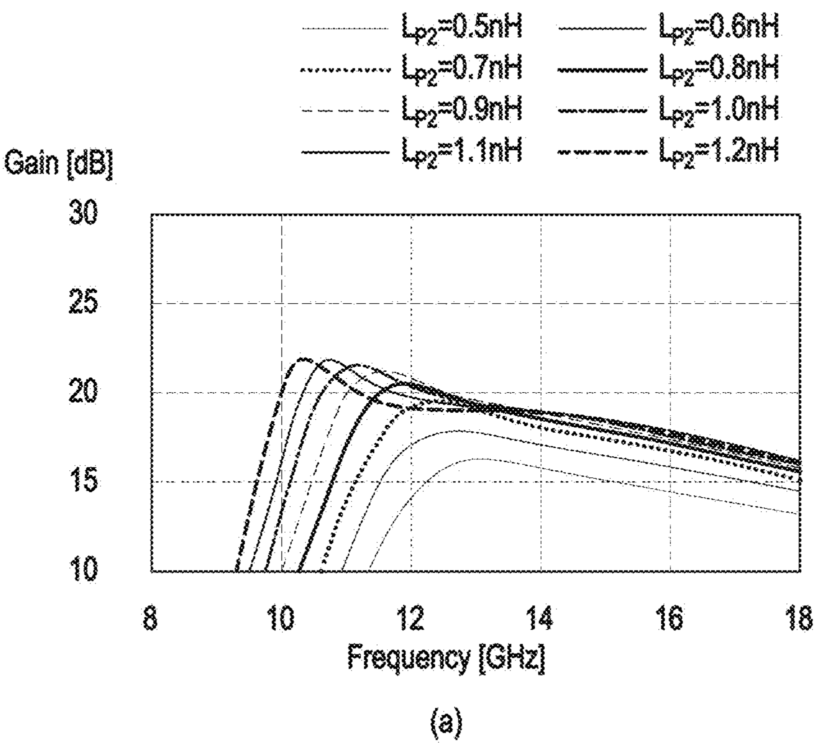
FIG. 7 illustrates a diagram of results of simulating the gain of a receiver using an LNA according to an embodiment of the disclosure.
Figure 7:
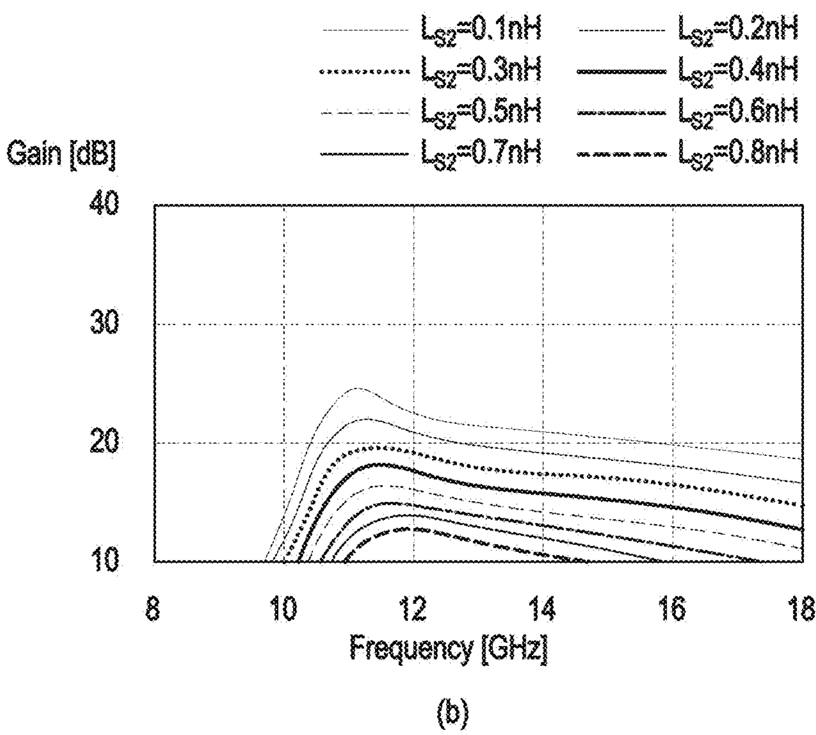

FIG. 7 is a diagram illustrating results of simulating the gain of a receiver using an LNA according to an embodiment of the disclosure.

FIG. 7 illustrates results obtained by simulating the gain of the receiver using the LNA illustrated in FIG. 6. The frequency of the x-axis illustrated in (a) of FIG. 7 represents a resonance frequency ($\omega=1/\sqrt{L_{P2}\times c_{parasitic}}$) of the LNA determined by the parasitic capacitance of a transistor M2 of FIG. 6 and a primary coil LP2 610 of the transformer TF 600.

Referring to (b) of FIG. 7, a loop gain by feedback is determined by an effective turn ratio $n=\sqrt{L_P/L_S}$ of the TF, and accordingly, it can be seen that n increases and the feedback gain increases as the inductance value of the secondary coil LS2 615 of the transistor M2 of FIG. 6 decreases.

Figure 8:
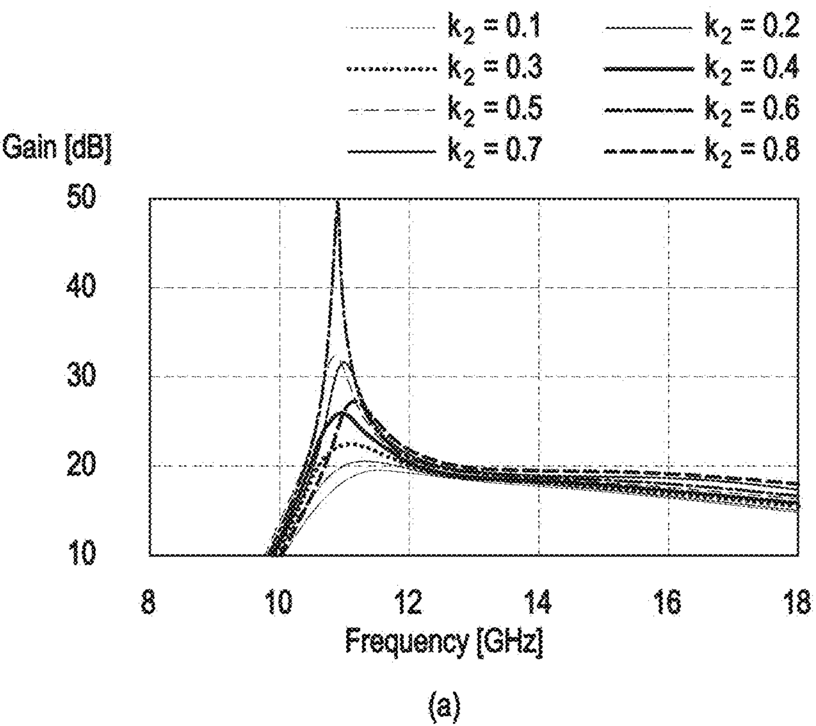
FIG. 8 illustrates a diagram of results of simulating gain and k-factor according to k values in a receiver using a low noise amplifier according to an embodiment of the disclosure.
Figure 8:
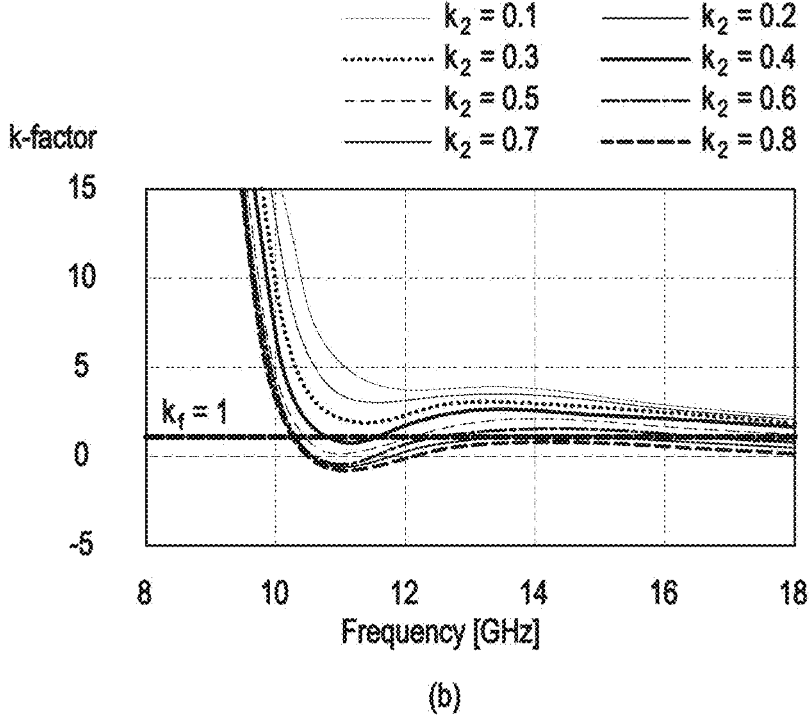

FIG. 8 is a diagram illustrating results of simulating gain and k-factor according to k values in a receiver using an LNA according to an embodiment of the disclosure.

FIG. 8 illustrates results obtained by simulating a case in which, in an amplifier with a two-stage structure, the 1st-stage uses the negative feedback of a first gate-source transformer and the 2nd-stage uses the positive feedback of a second gate-source transformer. Here, k2 denotes a coupling coefficient of the second gate-source transformer implementing positive feedback.

A k-factor is a value through which the stability of the circuit at the circuit or system design stage can be determined, and can derive Equation 1 below.

$$k=\frac{1-|S_{11}|^2-|S_{22}|^2+|\Delta|^2}{2|S_{12}S_{21}|} \quad (1)$$

Where $\Delta=S_{11}S_{22}-S_{12}S_{21}$. Here, $S_{12}$ denotes a power ratio of power returning from an output port (port 2) to an input port (port 1) (i.e., feedback power), and $S_{21}$ denotes a power ratio of the output port (port 2) to the input port (port 1). When K-factor is greater than 1, the corresponding circuit is unconditionally stable, and when K-factor is less than 1, the circuit is conditionally stable.

Referring to (a) of FIG. 8, it can be seen that the intensity of cancellation of inductive source degeneration in the TF 600 of FIG. 6 is determined by a magnetic coupling coefficient k2. In this case, when a corresponding LNA is designed excluding the k2 value where oscillation occurs, the positive feedback of the GS TF that maintains stability can be used to design the LNA.

Referring to (b) of FIG. 8, in order for the LNA to maintain the stable state, the k-factor kf should be maintained above 1. In consideration of this, when the LNA is designed by determining the k2 value, it can be seen that the positive feedback of the GS TF proposed in FIG. 6 can be used in the design of the LNA. That is, in (b) of FIG. 8, k2 where kf=1 or more should be 0.3 or less, and this may vary depending on the structure and design method of the LNA.

Figure 9:
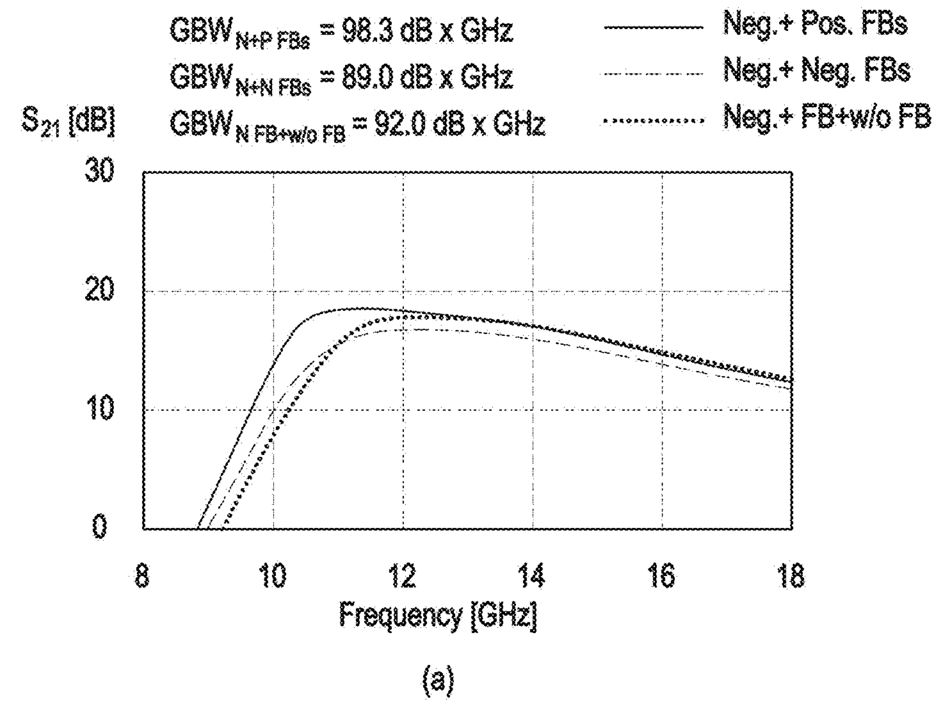
FIG. 9 illustrates a diagram of results of simulating gain and return-loss in a receiver using an LNA according to an embodiment of the disclosure.
Figure 9:
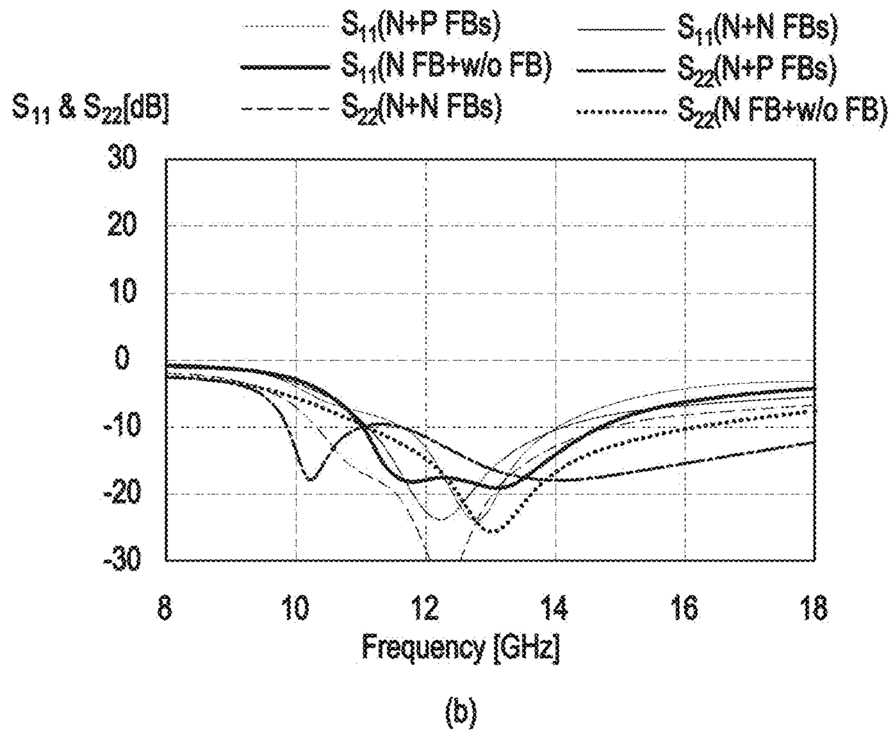

FIG. 9 is a diagram illustrating results of simulating gain and return-loss in a receiver using an LNA according to an embodiment of the disclosure.

FIG. 9 illustrates results of simulating the return-loss of $S_{21}$ and $S_{11}$ & $S_{22}$ by comparing a case in which, in a two-stage amplifier, the 1st-stage uses negative feedback N FB of a first gate-source TF and the 2nd-stage uses positive feedback P FB or negative feedback N of a second gate-source TF, and a case without feedback (w/o FB). The $S_{21}$ is the same as $S_{21}$ in the k-factor described above, and denotes a power ratio of the output port (port 2) to the input port (port 1), that is, gain.

Referring to (a) of FIG. 9, when comparing the case in which the 1st-stage uses negative feedback N FB of a first gate-source TF and the 2nd-stage uses positive feedback P FB or negative feedback N of a second gate-source TF, and a case without feedback (w/o FB), it can be seen that a gain band-width product (Gain×Band-width) (GBWN+P FBs) is numerically the largest in the case in which the 1st-stage uses the negative feedback of the first gate-source TF and the 2nd-stage uses the positive feedback of the second gate-source TF.

In addition, as illustrated in (b) of FIG. 9, it can be seen that the input Su and output $S_{22}$ return-loss can be designed to be more than the generally recommended 10 dB within a given operating frequency range, regardless of the type and use of feedback of TF.

Figure 10A:
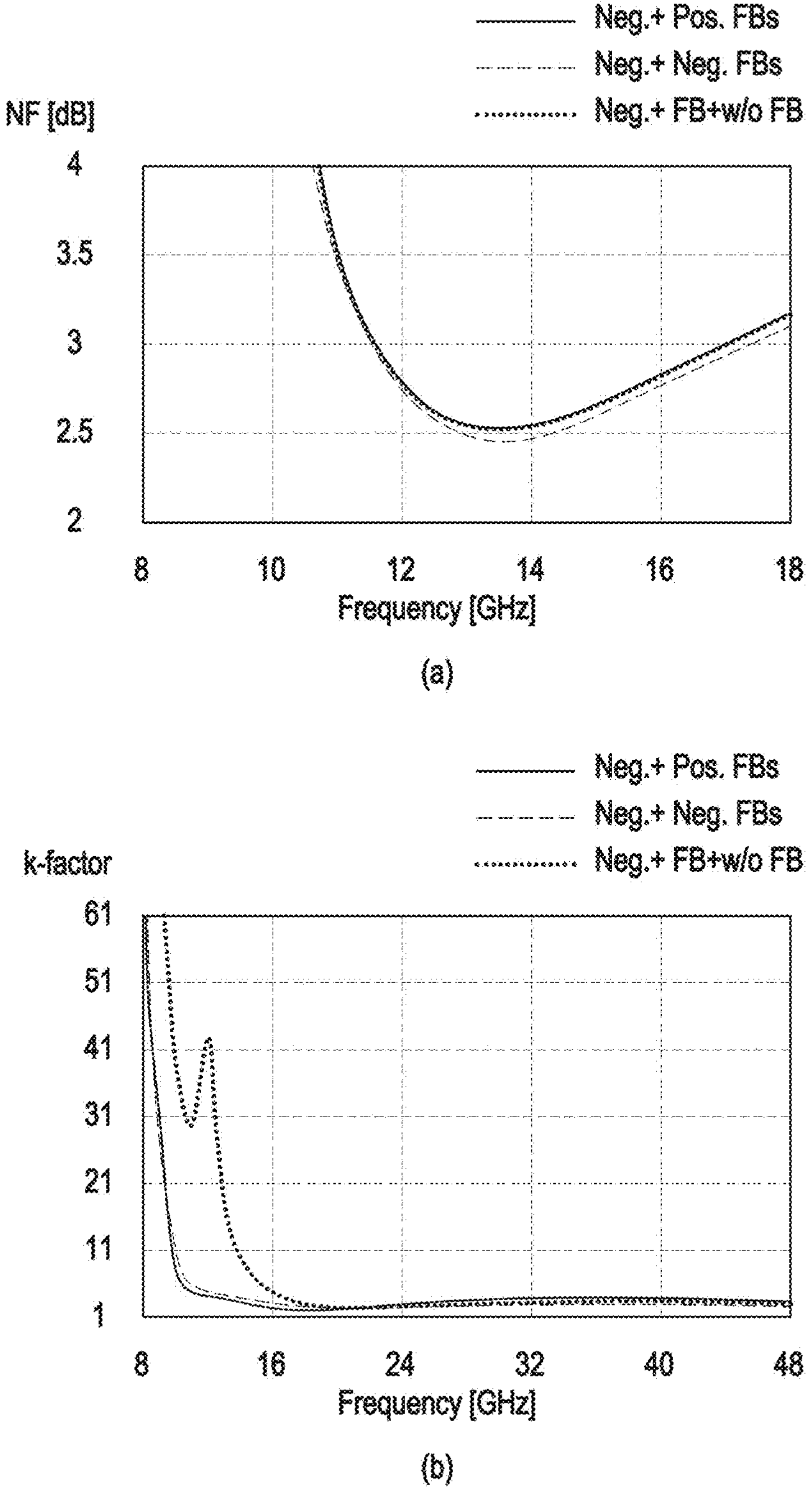
FIGS. 10A and 10B illustrate diagrams of results of simulating NF and k-factor in a receiver using an LNA according to an embodiment of the disclosure.

FIG. 10A is a diagram illustrating results of simulating NF and k-factor in a receiver using an LNA according to an embodiment of the disclosure.

FIG. 10A is a diagram illustrating results of simulating NF and k-factor by comparing a case in which, in a two-stage amplifier, the 1st-stage uses negative feedback N FB of a first gate-source TF and the 2nd-stage uses positive feedback P FB or negative feedback N of a second gate-source TF, and a case without feedback (w/o FB).

Figure 10B:
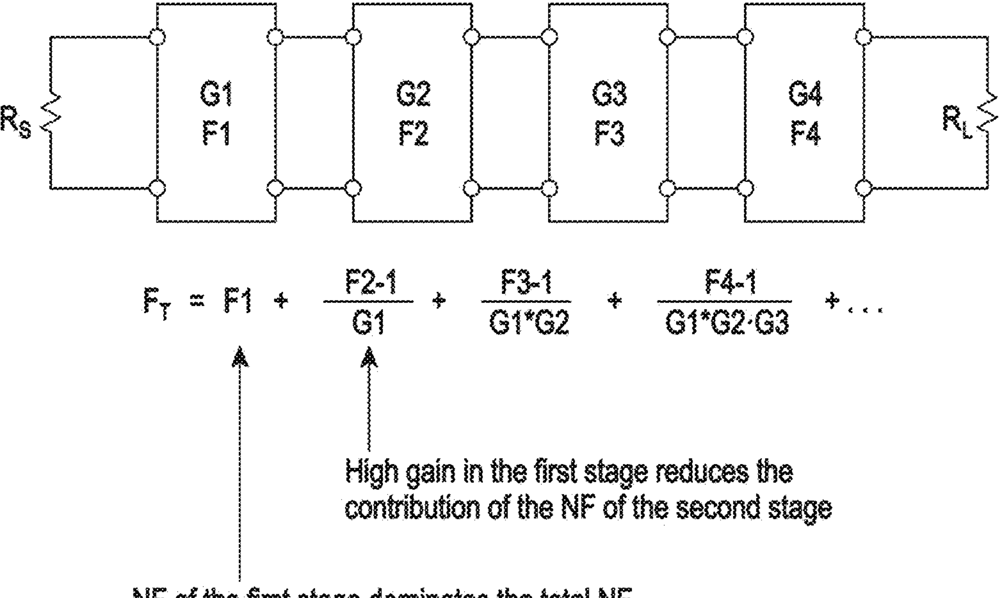

Referring to (a) of FIG. 10A, it can be seen that NF performance is the best when the 1st-stage uses the negative feedback N FB of the first gate-source TF and the 2nd-stage uses the negative feedback of the second gate-source TF (Neg.+Neg. FBs). However, it can be seen that, when the negative feedback is used in the second gate-source TF of the 2nd-stage (Neg.+Pos. FBs), the degree of deterioration is not significant. This is because, as illustrated in FIG. 10B, according to the definition of cascade NF (FT), the NF (F1) of the 1st-Stage is dominant.

Referring to (b) of FIG. 10A, when comparing the case in which the 1st-stage uses negative feedback N FB of the first gate-source TF, the 2nd-stage uses positive feedback P FB or negative feedback N of the second gate-source TF, and a case without feedback (w/o FB), as described in FIG. 8, when the LNA is designed in consideration of a coupling coefficient k2 where the k-factor is greater than 1, the k-factor will be greater than 1, enabling stable design.

FIGS. 11A, 11B, 11C, and 11D illustrate the structure of an LNA according to an embodiment of the disclosure.

FIGS. 11A, 11B, 11C, and 11D are diagrams specifically illustrating examples of transformer feedback implemented in the two-stage LNA illustrated in FIG. 5.

Figure 11A:
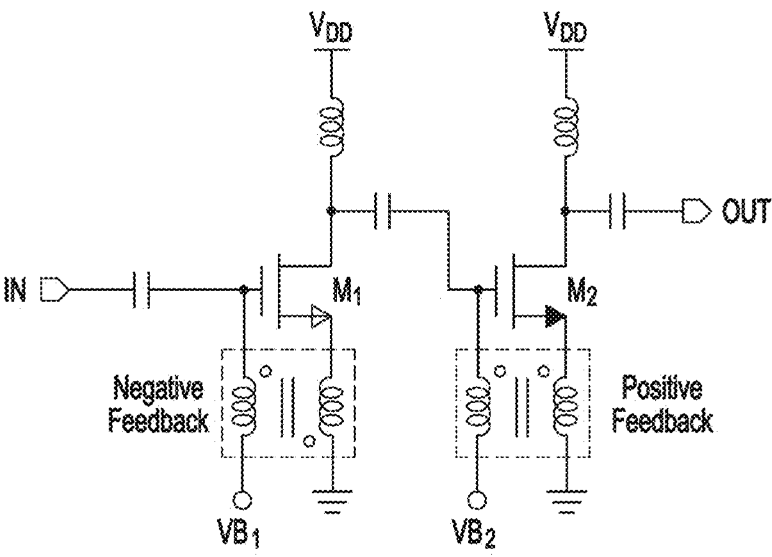
FIGS. 11A, 11B, 11C, and 11D illustrate the structure of an LNA according to an embodiment of the disclosure.

FIG. 11A illustrates an example of a circuit in which the 1st-stage uses the negative feedback of the gate-source TF and the 2nd-stage uses the positive feedback of the gate-source TF.

Figure 11B:
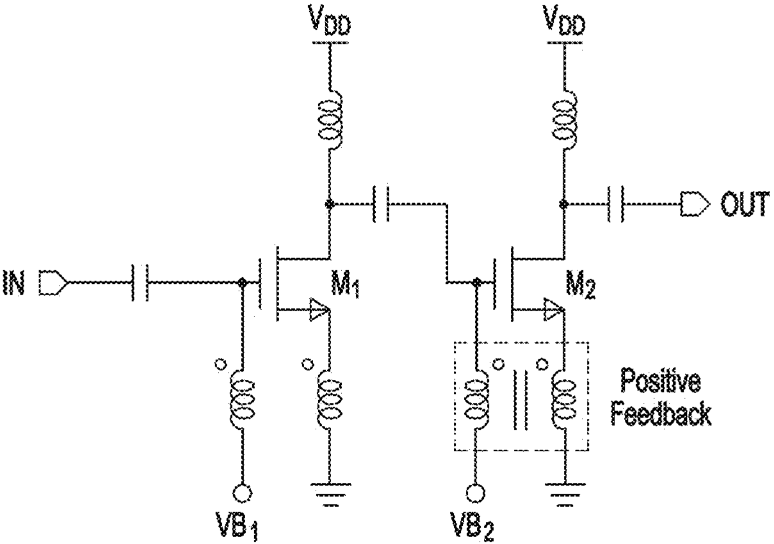

FIG. 11B illustrates an example of a circuit in which the 1st-stage does not use a TF and the 2nd-stage uses the positive feedback of the gate-source TF. This can maximize the NF performance of the LNA, but the chip area may be larger than that when using a TF.

Figure 11C:
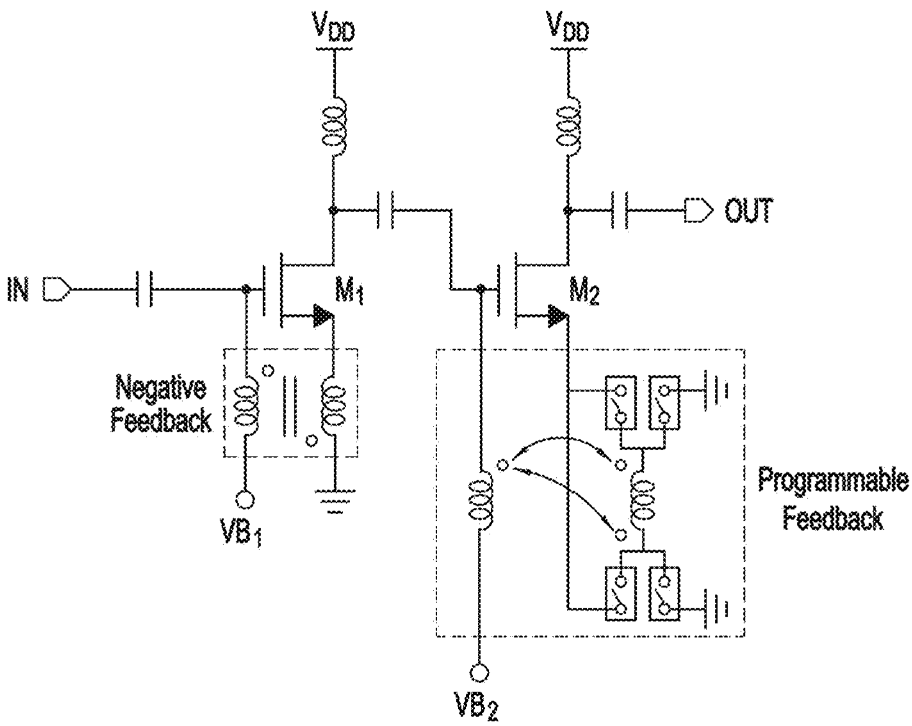

FIG. 11C illustrates an example of a circuit in which the 1st-stage uses negative feedback of the gate-source TF and the 2nd-stage can select negative feedback and positive feedback by applying a programmable transformer as the gate-source TF. This can make it possible to implement a gain control circuit without additional loss (when using an attenuator) and power consumption (when changing the current steering circuit and bias).

Figure 11D:
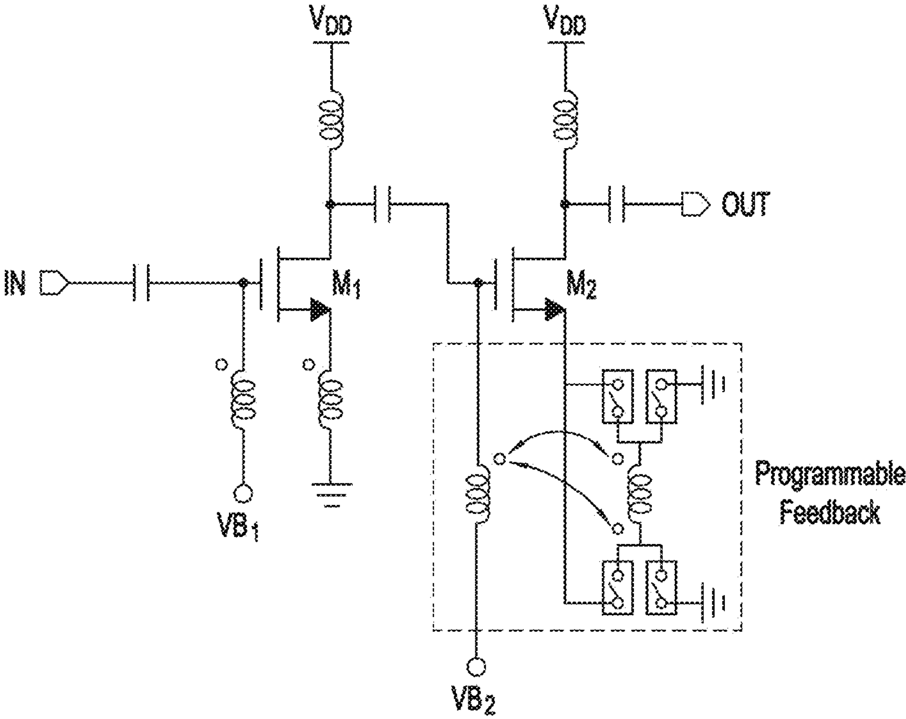

FIG. 11D illustrates an example of a circuit in which the 1st-stage does not use a TF and the 2nd-stage can select negative feedback and positive feedback by applying a programmable transformer as the gate-source TF. This can make it possible to implement a gain control circuit without additional loss (when using an attenuator) and power consumption (when changing the current steering circuit and bias).

As an example, when the LNA is designed, the 1st-stage may use positive feedback in a TF, and the 2nd-stage may not use a transformer. In this case, the NF performance may deteriorate, but linearity performance may be improved, making it possible to use the LNA as a driving amplifier.

Figure 12:
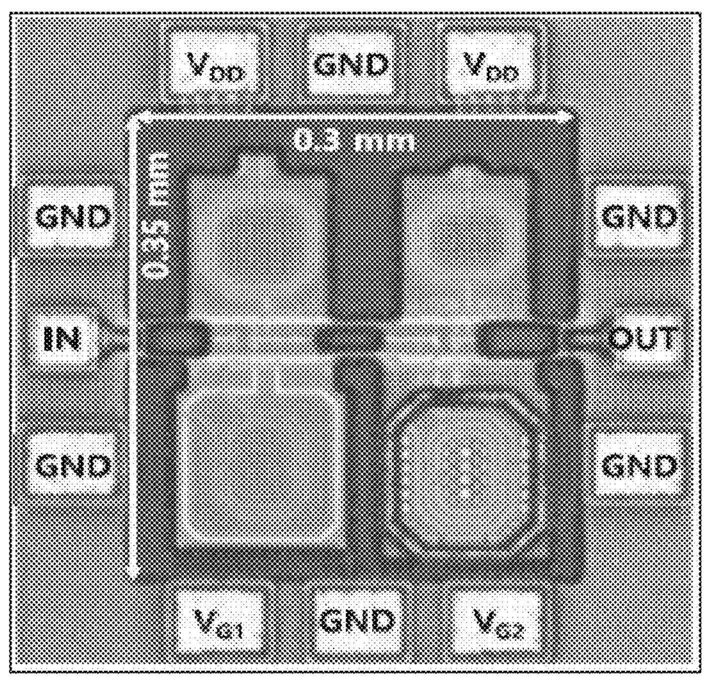
FIG. 12 illustrates a diagram of an example of a chip design using a transformer of an LNA according to an embodiment of the disclosure.
Figure 12:
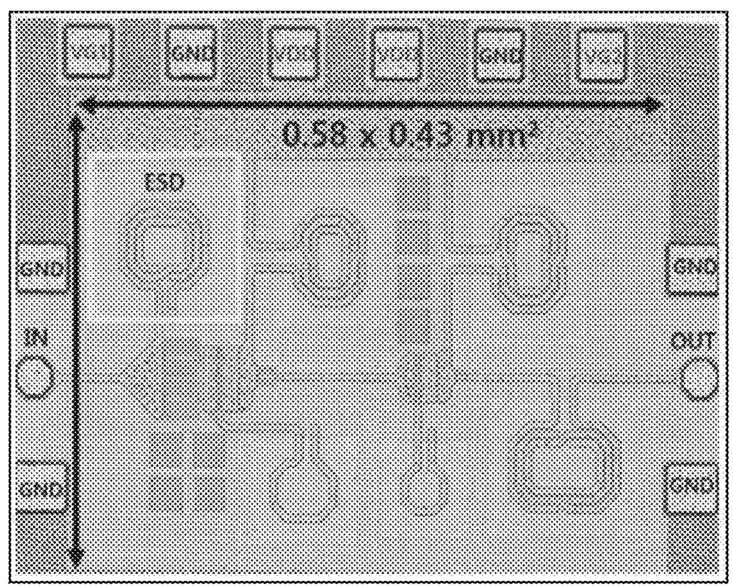

FIG. 12 is a diagram illustrating an example of a chip design using a transformer of an LNA according to an embodiment of the disclosure.

In (a) of FIG. 12, an example of a chip designed using a transformer when designing an amplifier with a two-stage structure is illustrated, and in (b) of FIG. 12, an example of a chip using only a lumped inductor is illustrated. Compared to the chip designed using only the lumped inductor in (b) of FIG. 12, when designing a two-stage amplifier in (a) of FIG. 12, a chip designed using a transformer can significantly reduce the chip area, enabling a compact design.

Figure 13:
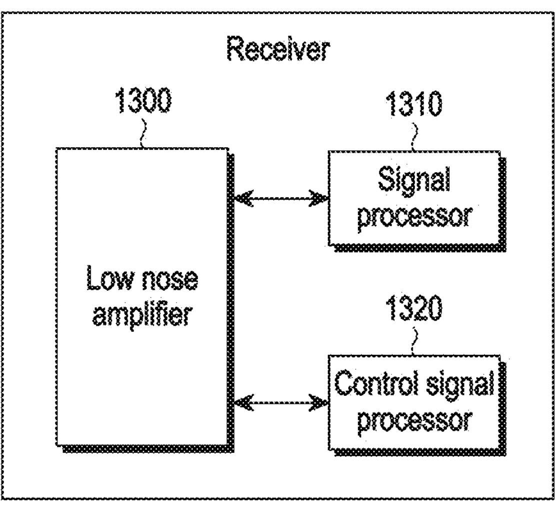
FIG. 13 illustrates a diagram of the structure of a receiver including an LNA according to an embodiment of the disclosure.

FIG. 13 is a diagram illustrating the structure of a receiver including an LNA according to an embodiment of the disclosure.

Referring to FIG. 13, a receiver may include an LNA 1300, a signal processor 1310, and a control signal processor 1320. The LNA 1300, signal processor 1310, and control signal processor 1320 of the receiver may operate according to the method(s) described in the above-described embodiments of FIGS. 1 to 12. However, the components of the receiver are not limited to the examples described above. For example, the receiver may include more or fewer components than those described above. In addition, the LNA 1300, the signal processor 1310, and the control signal processor 1320 may be implemented in the form of at least one chip.

The signal processor 1310 may apply an RF signal to the LNA 1300.

The LNA 1300 may include a first transistor and a first feedback transformer in which a gate of the first transistor is connected to a primary coil of the first feedback transformer and a source of the first transistor is connected to a secondary coil of the first feedback transformer. In an embodiment, the RF signal may be applied to the primary coil and then transmitted to the secondary coil in the same phase.

In an embodiment, a coupling coefficient of the first feedback transformer may be determined such that a k-factor is 1 or greater.

In an embodiment, the LNA 1300 may further include a second transistor in which a drain of the second transistor is connected to the gate of the first transistor. In an embodiment, the LNA 1300 may further include a second feedback transformer in which a gate of the second transistor is connected to the primary coil of the second feedback transformer and a source of the second transistor is connected to a secondary coil of the feedback transformer.

In an embodiment, in the receiver, the second feedback transformer may be configured to implement negative feedback that maintains opposite phase signals at the gate of the second transistor and the source of the second transistor.

In an embodiment, the LNA may be the first feedback transformer and the second feedback transformer may be a common source amplifier. In an embodiment, the first feedback transformer or the second feedback transformer may be implemented as a cascade amplifier structure.

In an embodiment, the phase of a signal coupled by the first feedback transformer and a signal implemented by the secondary coil may be opposite to each other.

In an embodiment, the LNA may further include a second transistor in which a drain of the second transistor is connected to the gate of the first transistor, a first inductor connected to the source of the second transistor, and a second inductor connected to the gate of the second transistor.

In an embodiment, the control signal processor 1320 may be the first feedback transformer, and may transmit a control signal by implementing positive feedback to maintain an in-phase signal at the gate of the first transistor and the source of the first transistor, or by implementing negative feedback to maintain an opposite-phase signal.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived based on the technical idea of the disclosure. Furthermore, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A low-noise amplifier (LNA) in a wireless communication system, the LNA comprising:

a first transistor; and a first feedback transformer in which a gate of the first transistor is connected to a primary coil of the first feedback transformer and a source of the first transistor is connected to a secondary coil of the first feedback transformer, wherein the first feedback transformer implements positive feedback to maintain an in-phase signal at the gate of the first transistor and the source of the first transistor.

2. The LNA of claim 1, wherein a coupling coefficient of the first feedback transformer is determined such that a k-factor is 1 or greater.

3. The LNA of claim 1, further comprising:

a second transistor of which a drain is connected to the gate of the first transistor; and a second feedback transformer in which a gate of the second transistor is connected to a primary coil of the second feedback transformer and a source of the second transistor is connected to a secondary coil of the second feedback transformer.

4. The LNA of claim 3, wherein the second feedback transformer is configured to implement negative feedback that maintains an opposite phase signal at the gate of the second transistor and the source of the second transistor.

5. The LNA of claim 3, wherein the first feedback transformer and the second feedback transformer are common source amplifiers.

6. The LNA of claim 3, wherein the first feedback transformer or the second feedback transformer is implemented as a cascade amplifier structure.

7. The LNA of claim 3, wherein the first feedback transformer is configured to implement, by a control signal, positive feedback to maintain an in-phase signal at the gate of the first transistor and the source of the first transistor, or negative feedback to maintain an opposite-phase signal.

8. The LNA of claim 1, wherein a phase of a signal coupled by the first feedback transformer and a phase of a signal implemented by the secondary coil are opposite to each other.

9. The LNA of claim 1, further comprising:

a second transistor of which a drain is connected to the gate of the first transistor; and a first inductor connected to a source of the second transistor and a second inductor connected to a gate of the second transistor.

10. A receiver configured to receive a radio frequency (RF) signal in a wireless communication system, comprising:

a low-noise amplifier (LNA); and a signal processor configured to apply the RF signal to the LNA, wherein the LNA comprises a first transistor and a first feedback transformer in which a gate of the first transistor is connected to a primary coil of the first feedback transformer and a source of the first transistor is connected to a secondary coil of the first feedback transformer, and wherein the RF signal is applied to the primary coil and then transmitted to the secondary coil in the same phase.

11. The receiver of claim 10, wherein a coupling coefficient of the first feedback transformer is determined such that a k-factor is 1 or greater.

12. The receiver of claim 10, wherein the LNA further comprises:

a second transistor of which a drain is connected to the gate of the first transistor; and a second feedback transformer in which a gate of the second transistor is connected to a primary coil of the second feedback transformer and a source of the second transistor is connected to a secondary coil of the second feedback transformer.

13. The receiver of claim 12, wherein the second feedback transformer is configured to implement negative feedback that maintains an opposite phase signal at the gate of the second transistor and the source of the second transistor.

14. The receiver of claim 12, wherein, in the LNA, the first feedback transformer and the second feedback transformer are common source amplifiers.

15. The receiver of claim 12, wherein the first feedback transformer or the second feedback transformer is implemented as a cascade amplifier structure.

16. The receiver of claim 12, further comprising:

a control signal processor, wherein the control signal processor is the first feedback transformer, and is configured to transmit a control signal to implement positive feedback to maintain an in-phase signal at the gate of the first transistor and the source of the first transistor, or to implement negative feedback to maintain an opposite-phase signal.

17. The receiver of claim 10, wherein a phase of a signal coupled by the first feedback transformer and a phase of a signal implemented by the secondary coil are opposite to each other.

18. The receiver of claim 10, wherein the LNA further comprises:

a second transistor of which a drain is connected to the gate of the first transistor; and a first inductor connected to a source of the second transistor and a second inductor connected to a gate of the second transistor.

* * * * *